No. 668,520. Patented Feb. 19, 1901.
C. S. JEWELL.
EGG TESTER.
(Application filed Oct. 3, 1900.)
(No Model.)
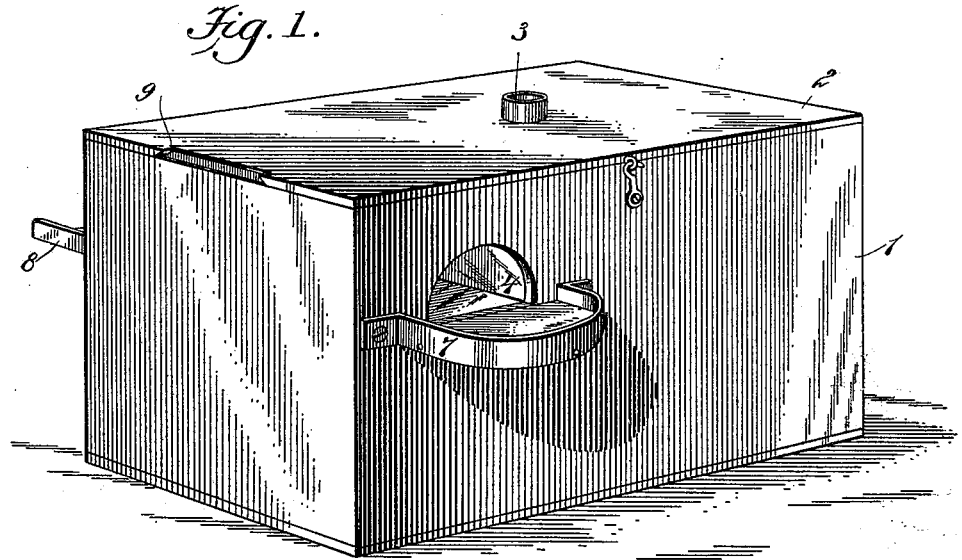
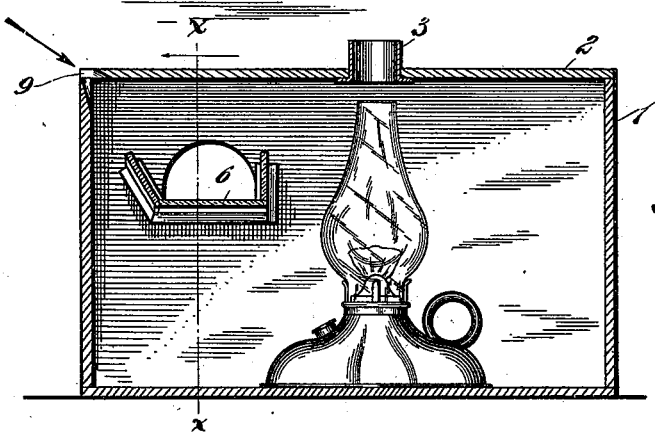
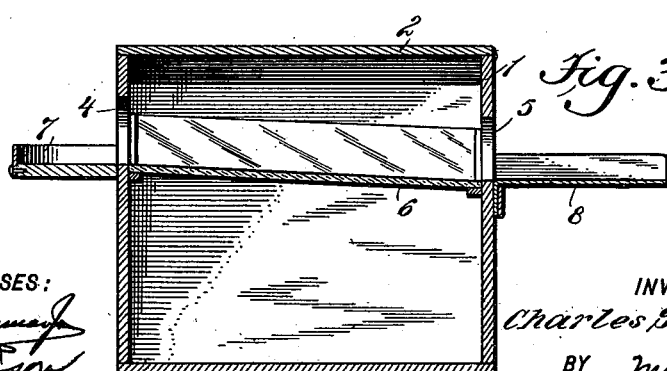
WITNESSES:
INVENTOR
Charles S. Jewell.
BY
ATTORNEYS

UNITED STATES PATENT OFFICE.

CHARLES S. JEWELL, OF RAHWAY, NEW JERSEY, ASSIGNOR TO ANNA H. JEWELL, OF SAME PLACE.

EGG-TESTER.

SPECIFICATION forming part of Letters Patent No. 668,520, dated February 19, 1901.

Application filed October 3, 1900. Serial No. 31,855. (No model.)

*To all whom it may concern:*

Be it known that I, CHARLES S. JEWELL, a citizen of the United States, and a resident of Rahway, in the county of Union and State of New Jersey, have invented a new and Improved Egg-Tester, of which the following is a full, clear, and exact description.

This invention relates to improvements in egg-testers; and the object is to provide a device of this character of very simple and comparatively inexpensive construction by means of which the eggs may be readily and rapidly tested.

I will describe an egg-tester embodying my invention and then point out the novel features in the appended claims.

Reference is to be had to the accompanying drawings, forming a part of this specification, in which similar characters of reference indicate corresponding parts in all the figures.

Figure 1 is a perspective view of an egg-tester embodying my invention. Fig. 2 is a longitudinal section thereof, and Fig. 3 is a section on the line $x$ $x$ of Fig. 2.

The egg-tester comprises a casing 1 of any suitable material and having a hinged cover 2, within which is arranged a pipe 3 for the outlet of smoke and products of combustion from a lamp designed to be placed in the casing. In one side wall of the casing near the end is an opening 4, and in the opposite side wall is an outlet-opening 5. Arranged within the casing and extended between these openings is a runway 6, consisting of glass or other suitable transparent material. This runway has a bottom portion and side walls. At the inlet-opening 4 is a tray 7, connected to the outer side of the casing, and connected to the opposite side of the casing in line with the outlet-opening 5 is a discharge-spout 8.

In operation a lamp or other suitable illuminating device is to be placed within the casing, as indicated in Fig. 2. Then the eggs one at a time are placed in the tray 7 and allowed to run down the transparent runway 6, which, as shown in Fig. 3, is inclined from its receiving end to its exit. As the egg passes along this runway it may be viewed through a sight-opening 9, formed in the end of the casing. It is well known that if an egg appears transparent when held to the light it is an evidence of its freshness; if opaque, it is considered as bad. The eggs of course will pass from the runway 6 onto the spout 8, from which they may be removed and placed in a suitable receptacle.

While I have shown a lamp as an illuminating device, it is obvious that an electric light may be placed within the casing.

Having thus described my invention, I claim as new and desire to secure by Letters Patent—

1. An egg-tester, comprising a casing having openings in its opposite side walls, and a runway extending between the openings, and through which light may pass, the said runway being inclined downward from its inlet to its outlet end, whereby eggs may roll in said raceway, substantially as specified.

2. An egg-tester, comprising a casing, having openings in its opposite walls, a runway extended between the openings, the said runway being inclined from its inlet to its outlet end and consisting of transparent material, and a tray attached to the casing at the inlet-opening, substantially as specified.

3. An egg-tester, comprising a casing having openings in its opposite walls, a transparent runway extended between said openings and inclined downward to the outlet-opening, a tray attached to the casing at the inlet-opening, a spout attached to the casing at the outlet-opening, and an illuminating device in the casing, substantially as specified.

In testimony whereof I have signed my name to this specification in the presence of two subscribing witnesses.

CHARLES S. JEWELL.

Witnesses:
 JNO. M. RITTER,
 C. R. FERGUSON.